United States Patent [19]

Noveroske

[11] 3,820,973

[45] June 28, 1974

[54] METHOD AND COMPOSITION FOR THE STIMULATION OF PLANT GROWTH

[75] Inventor: Robert L. Noveroske, Midland, Mich.

[73] Assignee: The Dow Chemical Company, Midland, Mich.

[22] Filed: June 12, 1973

[21] Appl. No.: 369,367

[52] U.S. Cl.................................. 71/77, 71/94
[51] Int. Cl.............................. A01n 9/22
[58] Field of Search................... 71/77, 94

[56] References Cited
UNITED STATES PATENTS
3,578,434  5/1971  Noveroski et al................ 71/77

Primary Examiner—Lewis Gotts
Assistant Examiner—Catherine L. Mills
Attorney, Agent, or Firm—S. Preston Jones

[57] ABSTRACT

Method for the stimulation of plant growth in the presence or absence of plant attacking fungal organisms which comprises treating plant seeds with a growth stimulating amount of a composition comprising 2-amino-6-chloro-4-(trichloromethyl) pyridine, as the active growth stimulant, in intimate admixture with an inert carrier therefor.

2 Claims, No Drawings

METHOD AND COMPOSITION FOR THE STIMULATION OF PLANT GROWTH

SUMMARY OF THE INVENTION

The present invention is directed to a method for the stimulation of plant growth in the presence or absence of plant attacking fungal organisms which comprises treating plant seeds with a growth stimulating amount of a composition comprising 2-amino-6-chloro-4-(trichloromethyl)pyridine, as the active growth stimulant, in intimate admixture with an inert carrier therefor.

The present invention relates to plant husbandry and the raising of crop plants; and is particularly concerned with an agronomic practice for promoting the growth of plants.

A number of plant growth promoters have been found, but there has been little use of most of these materials since many of the known growth promoters are highly phytotoxic and have little latitude in the number of dilutions between phytotoxicity and growth promotion. Further, many of them are plant specific making them useful with only a very few different plants.

In addition, many of the prior art compounds which have been found to have growth promoting activity have not been found to maintain this activity with plants subjected to high fungal attack (high fungal pressure) and are therefore normally employed only in fungal free invironments.

It has now been found that 2-amino-6-chloro-4-(trichloromethyl)pyridine has a high degree of plant growth stimulation activity and a low phytotoxicity potential. In addition, this compound has been found to maintain this activity both in the presence or absence of plant attacking fungal organisms of the genera Pythium, Rhizoctonia and Fusarium. Further, this compound gives positive growth responses on a wide variety of agronomic crops among both narrow-leaf and broad-leaf classes.

The present invention is applicable to the cultivation and growing of a number of useful crops including, among others, rice, corn, wheat, soybeans, cotton, peas, beets, beans, grapes, potatoes and cucumbers. This invention provides a method which enhances the growth of useful crops both in terms of the number of plants which can be grown per acre and/or the yield of the individual plants. In addition, seeds treated by the present method have decreased emergence time and the plants have a more rapid growth and earlier maturation than would be otherwise obtained in the absence of this treatment.

The application to seeds of an effective growth stimulating dosage of 2-amino-6-chloro-4-(trichloromethyl)pyridine is essential and critical for the practice of the present invention. The application of this dosage inherently provides a microbiocidal dosage of this compound to the seed, as well. At the same time, care must be observed not to apply so large a dosage as to give rise to lasting symptoms of phytotoxicity in the plant. Good results are obtained when the seeds are treated with 2-amino-6-chloro-4-(trichloromethyl)pyridine at a dosage of from about 1/16 oz. per hundred pounds of seed up to the phytotoxic threshold. The latter is about 4 ounces per hundred pounds of seed inasmuch as lasting phytotoxic effects are obtained with most plants at dosage levels above the 4 ounce level. Depending on the particular plant species and variety and on the growing conditions (extremely hot growing conditions accelerating phytotoxicity in cotton, for example), some undesirable phytotoxic effects may be encountered even below the 4 ounce level. Accordingly, a preferred range is from about ⅛ to about 2 ounces of 2-amino-6-chloro-4-(trichloromethyl)pyridine per hundred pounds of seed. Within this range the maximum growth response is obtained, and any phytotoxicity experienced in the very early stages of plant growth is usually overcome as the plant begins the more rapid growth and maturation habit which characterizes the present process. It may be noted that soybeans are particularly sensitive in this regard, and best results are obtained in their treatment at maximum dosage levels of about ¼ ounce per hundred pounds of seed. Usage of 2-amino-6-chloro-4-(trichloromethyl)pyridine in amounts above these preferred levels, and up to about 1 ounce per hundred pounds of seed, may have benefits from a disease control standpoint in some instances and can be resorted to when phytotoxicity factors so permit.

The method of the present invention may be carried out by treating the seeds with the unmodified 2-amino-6-chloro-4-(trichloromethyl)pyridine compound. However, said method also embraces the employment of liquid or dust compositions containing this compound. In such usage, the compound may be modified with one or more of a plurality of additaments, microbicide or fungicide adjuvants, including solvents or other liquid carriers, surface-active dispersing agents and carriers such as finely divided inert solids. Depending on the concentration of toxicant, such augmented compositions are adapted to be applied to seeds, or employed as concentrates and subsequently diluted with additional adjuvant or carrier to produce the ultimate seed treating compositions. The required amount of the 2-amino-6-chloro-4-(trichloromethyl)pyridine conveniently may be applied in from about 1 to 50 ounces of liquid or solid carrier, per hundred pounds of seeds.

The exact concentration of the 2-amino-6-chloro-4-(trichloromethyl)pyridine toxicant compound to be employed in the treating composition may vary provided the required fungicidal and growth promoting dosage of the active compound is applied to the seeds. The concentration in liquid and dust compositions employed to supply the desired dosage generally is from about 0.1 to 50 percent by weight. In dusts, the concentration of the effective agent may be from about 1 to 20 percent by weight. In compositions to be employed as concentrates, the active agent may be present in a concentration of from about 5 to 98 percent by weight.

In the preparation of dust or wettable powder compositions, the active stimulant compound can be compounded with any of the finely divided inert solids, such as pyrophyllite, talc, chalk, gypsum, fuller's earth, bentonite, attapulgite, and the like. In such operations, the finely divided carrier is ground or mixed with the active compound or wet with a solution of the active compound in a volatile inert organic solvent. Also, such dust compositions when employed as concentrates can be dispersed in water, with or without the aid of dispersing agents to form spray mixtures.

Granular formulations are usually prepared by impregnating a solution of the toxicant in a volatile inert organic solvent onto a bed of coarsely divided attapulgite, bentonite, diatomite, or the like.

Similarly, the active stimulant products can be compounded with a suitable water-immiscible inert organic liquid and a surface active dispersing agent to produce an emulsifiable concentrate which can be further diluted with water and oil to form spray mixtures in the form of oil-in-water emulsions. In such compositions, the carrier comprises an aqueous emulsion, i.e., a mixture of inert water-immiscible solvent, emulsifying agent and water. Preferred dispersing agents which can be employed in these compositions, are oil-soluble materials including non-ionic emulsifiers such as the condensation products of alkylene oxides with the inorganic acids, polyoxyethylene derivatives or sorbitan esters, complex ether alcohols and the like. Also, oil-soluble ionic emulsifying agents such as mahogany soaps can be used. Suitable inert organic liquids which can be employed in the composition include petroleum oils and distillates, toluene, liquid halohydrocarbons, and synthetic organic oils and vegetable oils. The surface-active dispersing agents are usually employed in liquid composition and in the amount of from 0.1 to 20 percent by weight of the combined weight of the dispersing agent and active compound.

In addition, other liquid compositions containing the desired amount of effective agent can be prepared by dissolving the active compound in an inert organic liquid such as acetone, methylene chloride, chlorobenzene and petroleum distillates. The preferred inert organic solvent carriers are those which are adapted to accomplish the distribution of the active compound upon the surfaces of the seeds and are of such volatility that they evaporate from the treated seeds and do not affect germination. Particularly desirable carriers are the petroleum distillates boiling almost entirely under 400°F. at atmospheric pressure and having a flash point above 80°F. The proportion of the compounds of this invention employed in a suitable solvent may vary from about 2 to about 50 percent or higher.

The treatment of the seeds may be accomplished by shaking or otherwise contacting the seeds with a dust composition containing the active agent, or by wetting the seeds with a liquid composition. In a convenient method of application, the compositions are applied in the form of dusts or sprays to the seeds as the latter are transported on the surface of a slowly moving belt or a perforated material such as a wire screen. In still another method, the required dosage of active agent can be applied on and about the seeds by the seed planting implement either in the hopper box or as the seeds are being planted into the soil or other growth media.

DESCRIPTION OF THE PREFERRED EMBODIMENTS

In order that the present invention may be more fully understood, the following examples are given to illustrate the manner by which it can be practiced but, as such, should not be construed as limitations upon the overall scope of the same.

EXAMPLE I

2-Amino-6-chloro-4-(trichloromethyl)pyridine

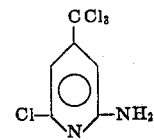

Fifteen grams (0.06 mole) of 2,6-dichloro-4-(trichloromethyl)pyridine are placed in a glass-lined pressure vessel along with 40 milliliters of anhydrous ammonia. The vessel is sealed and heated at 100°C. for 2 hours under autogenous pressures. At the end of this time, the contents of the vessel are removed and any excess ammonia present is allowed to evaporate off. The light brown residue is washed with water, dissolved in ethanol and treated with activated carbon. After filtration, water is added to the filtrate and the solution cooled to precipitate 11 grams of a light yellow crystalline product, having a melting point of 110°–112°C., which is substantially insoluble in water and of good solubility in acetone and benzene. This product is identified by infrared and NMR methods of analysis as 2-amino-6-chloro-4-(trichloromethyl)pyridine. Elemental analysis discloses the product to have carbon, hydrogen, nitrogen and chlorine contents of 29.19, 1.50, 11.34 and 57.78 percent, respectively, as against theoretical values of 29.0, 1.64, 11.5 and 58.8 percent, respectively, for the subject compound.

EXAMPLE II

A study was conducted following the practice of the present invention to determine the growth stimulating activity of the compound disclosed.

An acetone concentrate was prepared by admixing 133 milligrams of 2-amino-6-chloro-4-(trichloromethyl)pyridine with 2½ milliliters of acetone. Four two-fold serial dilutions were prepared from this concentrate by diluting portions of the concentrate with predetermined amounts of acetone. One milliliter aliquots of each dilution were applied to one and one-half (1½)

TABLE I

| Compound Employed | Dosage of Active Compound Per 100 Pounds of Seeds in Ounces | Test 1 | | | Test 2 | | | Test 3 | | |
|---|---|---|---|---|---|---|---|---|---|---|
| | | Number of Seeds Which Emerge of 40 Seeds Planted | Percentage of Seeds Which Emerge of 40 Seeds Planted | Average Weight of 10 Plants in Grams | Number of Seeds Which Emerge of 40 Seeds Planted | Percentage of Seeds Which Emerge of 40 Seeds Planted | Average Weight of 10 Plants in Grams | Number of Seeds Which Emerge of 40 Seeds Planted | Percentage of Seeds Which Emerge of 40 Seeds Planted | Average Weight of 10 Plants in Grams |
| 2-amino-6-chloro-4-(trichloromethyl)-pyridine | 2 | 22 | 55 | 11.0 | 24 | 60 | 13.2 | 23 | 58 | 12.7 |
| | 1 | 25 | 63 | 14.5 | 28 | 70 | 14.4 | 21 | 53 | 15.0 |
| | ½ | 33 | 83 | 13.8 | 35 | 88 | 14.2 | 36 | 90 | 13.1 |
| | ¼ | 32 | 80 | 13.8 | 35 | 88 | 13.2 | 34 | 85 | 12.6 |
| | ⅛ | 31 | 78 | 14.0 | 33 | 83 | 12.0 | 32 | 80 | 13.5 |
| Acetone Control | — | 27 | 68 | 12.9 | 31 | 78 | 14.9 | 31 | 78 | 12.8 |
| No Treatment Control | — | 32 | 80 | 12.0 | 35 | 88 | 12.9 | 32 | 80 | 13.7 | ounce seedlots of corn seeds. This application procedure results in an equivalent to treating 100 pounds of seeds at a dilution rate of 2, 1, ½, ¼ and ⅛ ounce of the active compound. Forty seeds from each treatment were thereafter planted into pots of sterile soil. Additional seeds, 40 treated with acetone alone and 40 untreated were also planted to serve as controls. After planting, the pots containing the seeds were watered and placed in a biochamber at 65°F. for 4 days. The pots were removed and placed in a greenhouse under conditions conducive to good plant growth for eight days. The pots were thereafter examined to determine the number of seeds from each treatment which emerged and the average weight of the plants (random groups of 10 plants were weighed to determine the average weight). After this test, 2 additional tests were run in a manner identical to the above. The results of these examinations are set forth in Table I.

EXAMPLE III

An additional study was conducted to determine the long range growth stimulating activity of the compound disclosed.

A test concentrate comprising 25 weight percent 2-amino-6-chloro-4-(trichloromethyl)pyridine, 63 weight percent Barden clay and 12 weight percent surfactant was prepared. Four two-fold serial dilutions were prepared by diluting portions of the concentrate with predetermined amounts of water. Aliquots of each dilution were applied equally to separate seedlots of 300 commercial acid delintered, mercury overcoated cotton seeds. This application procedure resulted in an equivalent to treating 100 pounds of seeds at a dilution rate of 4, 2, 1 and 0.5 ounce of the active compound. The seeds were thereafter planted in 25 foot long plots with rows 38 inches apart and with the plots being separated by 5 foot alleys. 300 Additional seeds which were not treated with the active compound, were also planted to serve as controls. After planting, the plots were maintained under normal plant cultivation practice conducive to good plant growth for 43 days. At the end of this period, the cotton bolls were harvested and the number of bales of cotton per acre obtained by each treatment was ascertained. The results are set forth below in Table II.

TABLE II

| Compound Employed | Dosage of Active Compound per 100 Pounds of Seeds in Ounces | Yield of Bales of Cotton per Acre |
| --- | --- | --- |
| 2-Amino-6-chloro-4-(trichloromethyl)pyridine | 4 | 2.81 |
|  | 2 | 2.88 |
|  | 1 | 2.78 |
|  | ½ | 2.48 |
| Control | — | 2.32 |

EXAMPLE IV

A study was conducted following the practices of the present invention to determine the fungicidal activity of the compound disclosed.

Various Barden clay mixtures were prepared by admixing a predetermined amount of 2-amino-6-chloro-4-(trichloromethyl)pyridine with a predetermined quantity of Barden clay. Aliquots of each mixture were applied to seed lots of little Marvel pea seeds in jars which were capped and rolled for 1 minute to evenly distribute the chemical. Thereafter 0.5 milliliter of water was added to each jar and the jars rolled until the contents were dry. This application procedure resulted in an equivalent to treating 100 pounds of seeds at a chemical rate of 1, ½, ¼, ⅛ and 1/16 ounce of active compound. Twenty-five seeds from each treatment were thereafter planted in pots of soil containing *Pythium ultimum*. Additional seeds, 25 treated with Barden clay alone, two separate 25 seedlots treated with water alone and 25 untreated were also planted to serve as controls. After planting, the pots containing the seeds were watered and placed in a biochamber for 4 days. The pots were removed and placed in a greenhouse under conditions conducive to good plant growth for 1 week. The plots were thereafter examined to determine the number of seeds from each treatment which germinated. After this test, additional tests were run in a manner identical to the above. The results of these examinations are set forth in Table III.

TABLE III

| Compound Employed | Dosage of Active Compound Per 100 Pounds of Seeds in Ounces | Number of Seeds Which Emerge from 25 Seeds Planted in Soil Containing *Pythium Ultimum* | | | |
| --- | --- | --- | --- | --- | --- |
| | | Test 1 | Test 2 | Test 3 | Test 4 |
| 2-Amino-6-chloro-4-(trichloromethyl)-pyridine | 1 | 23 | 21 | 22 | 21 |
| | 1/2 | 30 | 20 | 19 | 24 |
| | 1/4 | 18 | 16 | 20 | 18 |
| | 1/8 | 19 | 15 | 18 | 17 |
| | 1/16 | 16 | 12 | 14 | 13 |
| Barden Clay Control | — | 2 | 2 | 2 | 2 |
| Water Control | — | 4 | 1.5 | 4 | 3.5 |
| Untreated Control | — | 4 | 3 | 3 | 4 |

EXAMPLE V

A study was conducted to determine the degree of growth stimulation in terms of fruit yields on various crop plants with the compound disclosed.

A test concentrate comprising 6 weight percent 2-amino-6-chloro-4-(trichloromethyl)pyridine, 78 weight percent Barden clay and 16 weight percent surfactants was prepared. Serial dilutions were prepared by diluting portions of the concentrate with predetermined amounts of water. Aliquots of each dilution were applied equally to separate seedlots of 75 Dekalb XL-45 corn seeds. This application procedure resulted in an equivalent to treating 100 pounds of seeds at a dilution rate of 1, ½ and ¼ ounce of the active compound. The seeds were thereafter planted in 30 foot long plots. 25 Additional seeds which were not treated with the active compound were also planted to serve as controls. After planting, the plants were maintained under conditions conducive to good plant growth for 156 days. At the end of this growing period, the corn was harvested and the number of ears of corn per row and the weight of the total number of ears of corn per row was determined. The results of this determination is set forth below in Table IV.

Table IV

| Compound Employed | Dosage of Active Compound per 100 Pounds of Seeds in Ounces | Number of Ears of Corn per Row | Pounds of Ears of Corn per Row |
| --- | --- | --- | --- |
| 2-Amino-6-chloro-4-(trichloromethyl)pyridine | 1 | 49 | 24.2 |
|  | ½ | 46 | 23.1 |
|  | ¼ | 45 | 22.6 |
| Untreated Control | — | 43 | 22.6 |

EXAMPLE VI

A study was conducted to determine the degree of growth stimulation in terms of fruit yields on various crop plants with the compound disclosed.

A test concentrate comprising 6 weight percent 2-amino-6-chloro-4-(trichloromethyl)pyridine, 78 weight percent Barden clay and 16 weight percent surfactants was prepared. Serial dilutions were prepared by diluting portions of the concentrate with predetermined amounts of water. Aliquots of each dilution were applied equally to separate seedlots of 300 Chippewa variety soybean seeds. This application procedure resulted in an equivalent to treating 100 pounds of seeds at a dilution rate of 1, ½ and ¼ ounce of the active compound. The seeds were thereafter planted in 30 foot long plots. 60 Additional seeds which were not treated with the active compound were also planted to serve as controls. After planting, the plants were maintained under conditions conducive to good plant growth. Twenty-two days after planting the number of plants from each treatment which had emerged was determined; at the end of a three month growing period the soybeans were harvested and the weight of the soybeans per row was determined. The results of these determinations are set forth below in Table V.

Table V

| Compound Employed | Dosage of Active Compound per 100 Pounds of Seeds in Ounces | Percentage of Soybean Plants which Emerged in 22 Days from 300 Beans Planted | Pounds of Soybeans per Row |
| --- | --- | --- | --- |
| 2-Amino-6-chloro-4-(trichloromethyl)pyridine | 1 | 60 | 2.1 |
|  | ½ | 80 | 2.5 |
|  | ¼ | 82 | 2.7 |
| Untreated Control | — | 52 | 2.4 |

EXAMPLE VII

A study was conducted to determine the degree of growth stimulation in terms of fruit yields on various crop plants with the compound disclosed.

A test concentrate comprising 25 weight percent 2-amino-6-chloro-4-(trichloromethyl)pyridine, 63 weight percent Barden clay and 12 weight percent surfactants was prepared. Serial dilutions were prepared by diluting portions of the concentrate with predetermined amounts of water. Aliquots of each dilution were applied equally to separate seedlots of 500 Kinghorn wax bean seeds. This application procedure resulted in an equivalent to treating 100 pounds of seeds at a dilution rate of ½ and ¼ ounce of the active compound. The seeds were thereafter planted in 25 foot long plots. 100 Additional seeds which were not treated with the active compounds were also planted to serve as controls. After planting, the plants were maintained under conditions conducive to good plant growth for 69 days. At the end of this growing period, the wax bean plants (including the front) was harvested and the total weight of the wax bean plants per row was determined. The results of this determination is set forth below in Table VI.

Table VI

| Compound Employed | Dosage of Active Compound Per 100 Pounds of Seeds in Ounces | Total Weight of Wax Bean Plants Plus Fruit in Pounds |
| --- | --- | --- |
| 2-Amino-6-chloro-4-(trichloromethyl)-pyridine | ¼ | 7.8 |
|  | ½ | 7.9 |
| Untreated Control | — | 7.0 |

EXAMPLE VIII

A study was conducted to determine the degree of growth stimulation in terms of fruit yields on various crop plants with the compound disclosed.

A test concentrate comprising 25 weight percent 2-amino-6-chloro-4-(trichloromethyl)pyridine, 63 weight percent Barden clay and 12 weight percent surfactants was prepared. Serial dilutions were prepared by diluting portions of the concentrate with predetermined amounts of water. Aliquots of each dilution were applied equally to separate seedlots of 1500 F & M Monogerm No. 8230 sugarbeet seed. This application procedure resulted in an equivalent to treating 100 pounds of seeds at a dilution rate of 0.75 and 1.5 ounces of the active compound. The seeds were thereafter planted in 25 foot long plots containing 200 seeds per plot. 300 Additional seeds which were not treated with the active compound were also planted to serve as controls. After planting, the plants were maintained under conditions conducive to good plant growth. After a growing period of 20 days and a growing period of 71 days the plots were examined to determine the number of plants which were growing in each plot. At the end of the 71 day growing period the plants were harvested and the tops removed. The roots after cleaning were weighed to determine the total weight of the sugar beet root in each plot. The results of these examinations are set forth below in Table VII.

TABLE VII

| Compound Employed | Dosage of Active Compound per 100 Pounds of Seeds in Ounces | Number of Plants Growing per Plot of 200 Seeds Planted | | Pounds of Sugar Beet Roots per Plot after 71 Days of Growth |
| --- | --- | --- | --- | --- |
| | | 20 days | 71 days | |
| 2-Amino-6-chloro-4-(trichloromethyl)pyridine | 0.75 | 125 | 108 | 21.2 |
|  | 1.5 | 134 | 123 | 28.8 |
| Untreated Control | — | 108 | 97 | 12.9 |

EXAMPLE IX

An additional study was conducted to determine the long range growth stimulating activity of the compound disclosed.

A test concentrate comprising 25 weight percent 2-amino-6-chloro-4-(trichloromethyl)pyridine, 63 weight percent Barden clay and 12 weight percent surfactants were prepared. Serial dilutions were prepared by diluting portions of the concentrate with predetermined amounts of water. Aliquots of each dilution were applied equally to separate seedlots of 150 commercial acid delintered, mercury overcoated cotton seeds. This application procedure resulted in an equivalent to treating 100 pounds of seeds at a dilution rate of 4, 2, 1, ½ and ¼ ounces of the active compound. The seeds were thereafter planted in 25 foot long plots with rows 38 inches apart and with the plots being separated by 5 foot alleys. 50 Additional seeds which were not treated with the active compound, were also planted to serve as controls. After planting, the plots were maintained under normal plant cultivation practice conducive to good plant growth for 47 days. At the end of this period, the cotton bolls were harvested and the number of bales of cotton per acre obtained by each treatment was ascertained. The results are set forth below in Table VIII.

Table VIII

| Compound Employed | Dosage of Active Compound per 100 Pounds of Seeds in Ounces | Yield of Bales of Cotton per Acre |
|---|---|---|
| 2-Amino-6-chloro-4-(trichloromethyl)-pyridine | 4 | 2.58 |
| | 2 | 2.55 |
| | 1 | 2.50 |
| | ½ | 2.90 |
| | ¼ | 2.70 |
| Control | — | 2.09 |

EXAMPLE X

A study was conducted following the practice of the present invention to determine the growth promoting activity of the compound disclosed in treating plants in sterile soil and in fungal infested soil.

An acetone concentrate was prepared by admixing 142 milligrams of 2-amino-6-chloro-4-(trichloromethyl)pyridine with 2 milliliters of acetone. Five two-fold serial dilutions were prepared from this concentrate by diluting portions of the concentrate with predetermined amounts of acetone. One-half milliliter aliquots of each dilution were applied to 1-ounce seedlots of little Marvel pea seeds. This application procedure resulted in the equivalent of treating 100 pounds of seeds at dilution rates of 2, 1, ½, ¼, ⅛ and 1/16 ounces of the active compound. Twenty-five seeds from each treatment were thereafter planted into pots of sterile soil. 25 Additional seeds from each treatment were also planted into pots of soil containing *Pythium ultimum*. Additional seeds, 25 untreated (controls A and B) for each kind of soil and 25 treated only with acetone for each kind of soil were also planted as controls. After planting, the pots containing the seeds were watered and placed in a biochamber at 65°F. for 5 days. The pots were removed and placed in a greenhouse under conditions conducive to good plant growth for 1 week. The pots were thereafter examined to determine the number of seeds from each treatment which emerged and the average weight of the plants (random groups of ten plants were weighed to determine the average weight). After this test, an additional test was run in a manner identical to the above. The results of these examinations are set forth in Table IX.

Table IX

| | | Sterile Soil | | | | | |
|---|---|---|---|---|---|---|---|
| | | Test 1 | | | Test 2 | | |
| Compound Employed | Dosage of Active Compound Per 100 Pounds of Seed in Ounces | Number of Seeds Which Emerge of 25 Seeds Planted | Percentage of Seeds Which Emerge of 25 Seeds Planted | Average Weight of 10 Plants in Grams | Number of Seeds Which Emerge of 25 Seeds Planted | Percentage of Seeds Which Emerge of 25 Seeds Planted | Average Weight of 10 Plants in Grams |
| 2-Amino-6-chloro-4-(trichloromethyl)-pyridine | 2 | 21 | 84 | 7.2 | 22 | 88 | 6.7 |
| | 1 | 23 | 92 | 7.0 | 23 | 92 | 6.0 |
| | 1/2 | 25 | 100 | 6.9 | 24 | 96 | 6.6 |
| | 1/4 | 24 | 96 | 6.3 | 24 | 96 | 7.0 |
| | 1/8 | 24 | 96 | 6.7 | 23 | 92 | 7.0 |
| | 1/16 | — | — | — | — | — | — |
| Acetone Control | — | 19 | 76 | 5.6 | 24 | 96 | 6.6 |
| Untreated Control | — | 17 | 70 | 5.3 | 24 | 96 | 6.4 |

| | | Pythium Ultimum Containing Soil | | | | | |
|---|---|---|---|---|---|---|---|
| | | Test 1 | | | Test 2 | | |
| | | Number of Seeds Which Emerge of 25 Seeds Planted | Percentage of Seeds Which Emerge of 25 Seeds Planted | Average Weight of 10 Plants in Grams | Number of Seeds Which Emerge of 25 Seeds Planted | Percentage of Seeds Which Emerge of 25 Seeds Planted | Average Weight of 10 Plants in Grams |
| | | 23 | 92 | 5.5 | 20 | 80 | 4.5 |
| | | 23 | 92 | 4.5 | 24 | 96 | 4.5 |
| | | 24 | 96 | 4.4 | 21 | 84 | 4.8 |
| | | 23 | 96 | 3.4 | 23 | 92 | 3.8 |
| | | 20 | 80 | 3.4 | 21 | 84 | 3.8 |
| | | 8 | 20 | 2.5 | 8 | 20 | 1.9 |
| | | 11 | 44 | 2.8 | 6.5 | 23.7 | 1.8 |

EXAMPLE XI

A field study was conducted to determine the growth promoting activity in terms of seed germination of the compound disclosed.

A test concentrate comprising 50 weight percent 2-amino-6-chloro-4-(trichloromethyl)pyridine, 48 weight percent Barden clay and 2 weight percent surfactant was prepared. Serial dilutions were prepared by diluting portions of the concentrate with predetermined amounts of water. Aliquots of each dilution were applied equally to separate seedlots of commercial peanut seeds. This application procedure resulted in an equivalent to treating 100 pounds of seeds at a dilution rate of 2, 1 and ½ ounces of the active compound. The seeds were thereafter planted into 50 foot long plots. Additional seeds which were not treated with the active compound were also planted to serve as controls. After planting, the plants were maintained under conditions conducive to good plant growth. After growing periods of 14, 17 and 28 days, the plots were examined to determine the number of plants (on a 100 foot row basis) which emerged. The results of this determination are set forth below in Table X.

Table X

| Compound Employed | Dosage of Active Compound per 100 Pounds of Seeds in Ounces | Number of Plants Which Emerged Per 100 Feet of Plant Row Growing Period — Days | | |
|---|---|---|---|---|
| | | 14 | 17 | 28 |
| 2-Amino-6-chloro-4-(trichloromethyl)-pyridine | 2 | 34 | 46 | 53 |
| | 1 | 42 | 52 | 56 |
| | ½ | 44 | 48 | 51 |
| Untreated Control | — | 14 | 16 | 23 |

What is claimed is:

1. Method for the stimulation of plant growth which comprises treating plant seeds with a growth stimulating amount of a composition comprising 2-amino-6-chloro-4-(trichloromethyl)pyridine, as the active growth stimulant, in intimate admixture with an inert carrier therefor.

2. The method of claim 1 wherein the active growth stimulant is employed as a dosage rate of from about 1/16 ounce to 4 ounces per hundred pounds of seed.

* * * * *